United States Patent
Tice et al.

(10) Patent No.: US 6,392,536 B1
(45) Date of Patent: May 21, 2002

(54) MULTI-SENSOR DETECTOR

(75) Inventors: Lee D. Tice, Bartlett; Vincent Y. Chow, Hanover Park, both of IL (US)

(73) Assignee: Pittway Corporation, St. Charles, IL (US)

( * ) Notice: Subject to any disclaimer, the term of this patent is extended or adjusted under 35 U.S.C. 154(b) by 0 days.

(21) Appl. No.: 09/648,198

(22) Filed: Aug. 25, 2000

(51) Int. Cl.$^7$ ................................................ G08B 29/00
(52) U.S. Cl. ..................... 340/506; 340/511; 340/517; 340/522; 340/541; 340/508; 340/521
(58) Field of Search ................... 340/506, 507, 340/508, 517, 541, 521, 565, 522

(56) References Cited

U.S. PATENT DOCUMENTS

| | | |
|---|---|---|
| 3,826,180 A | 7/1974 | Hayashi |
| 3,938,115 A | 2/1976 | Jacoby |
| 4,016,524 A | 4/1977 | Pompei |
| 4,084,157 A | 4/1978 | Jacoby |
| 4,088,986 A | 5/1978 | Boucher |
| 4,638,304 A | 1/1987 | Kimura |
| 4,668,939 A | 5/1987 | Kimura et al. |
| 4,688,021 A | 8/1987 | Buck et al. |
| 4,725,820 A | 2/1988 | Kimura |
| 4,884,222 A | 11/1989 | Nagashima et al. |
| 5,103,096 A | 4/1992 | Wong |
| 5,568,130 A | 10/1996 | Dahl |
| 5,691,703 A | 11/1997 | Roby et al. |
| 5,691,704 A | 11/1997 | Wong |
| 5,786,767 A | 7/1998 | Seerino |
| 5,793,295 A | 8/1998 | Goldstein |
| 5,801,633 A | 9/1998 | Soni |
| 5,896,082 A | 4/1999 | MacFarlane |
| 5,914,655 A * | 6/1999 | Clifton et al. ............... 340/506 |
| 5,914,656 A | 6/1999 | Ojala et al. |
| 5,945,924 A | 8/1999 | Marman et al. |

* cited by examiner

*Primary Examiner*—Daryl Pope
(74) *Attorney, Agent, or Firm*—Welsh & Katz, Ltd.

(57) ABSTRACT

A multi-function detector has at least two different sensors coupled to a control circuit. In a normal operating mode the control circuit, which could include a programmed processor, processes outputs from both sensors to evaluate if a predetermined condition is present in the environment adjacent to the detector. In this mode the detector exhibits a predetermined sensitivity. In response to a failure of one of the sensors, the control circuit processes the output of the remaining operational sensor or sensors so that the detector will continue to evaluate the condition of the environment with substantially the same sensitivity.

57 Claims, 3 Drawing Sheets

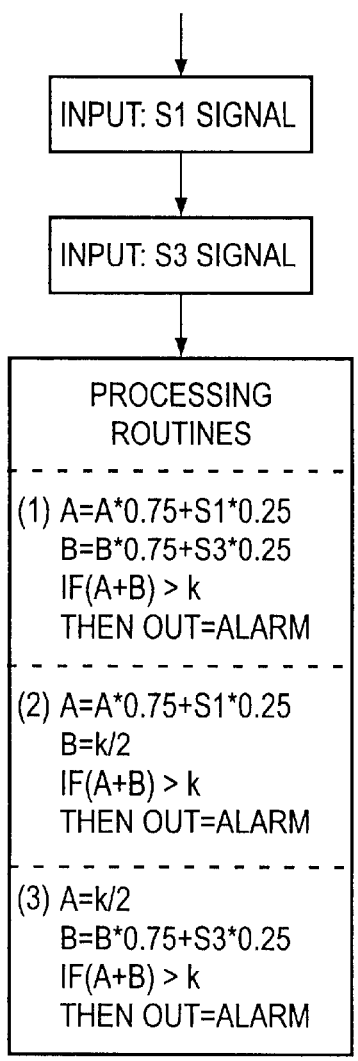
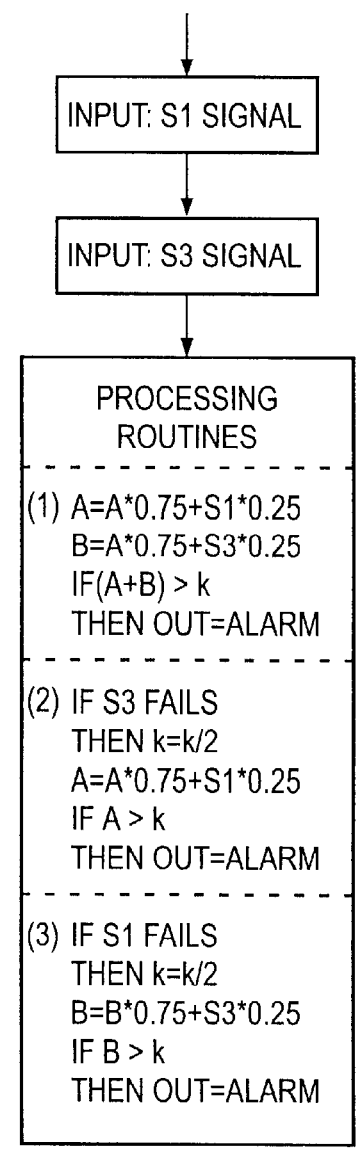

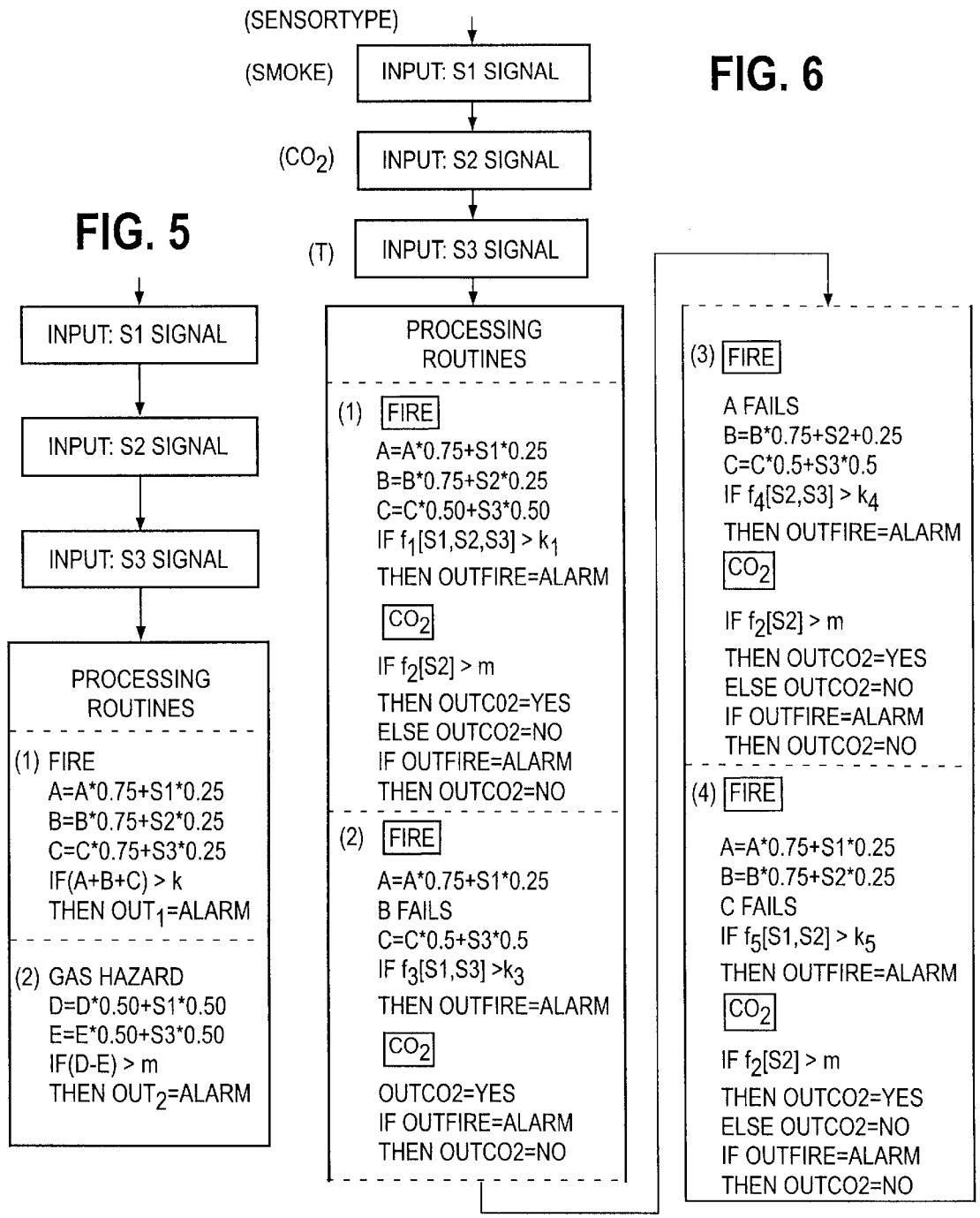

MULTI-SENSOR DETECTOR

FIELD OF THE INVENTION

The invention pertains to ambient condition detectors. More particularly, the invention pertains to such detectors which incorporate multiple sensors and processing circuitry and which exhibit improved operational characteristics in the presence of sensor failure.

BACKGROUND OF THE INVENTION

Known ambient condition detectors include one or more condition sensors. Representative sensors include smoke, heat and gas sensors.

In some detectors outputs from the respective sensors are processed substantially independently for purposes of determining if a predetermined condition, to which a respective sensor is responding, meets a selected alarm criteria. In other detectors, outputs from multiple sensors are taken into account in alarm determination processing.

In those detectors where alarm determinations are made in response to single sensor processing, a failure of one sensor will not necessarily affect processing of output signals from the other sensor. On the other hand, while multi-sensor processing can potentially provide the benefit of more complex, multi-input processing, loss of the output from one of the sensors, in known detectors, may result in a loss of sensitivity.

Known prior art detectors that process sensor outputs in parallel and independently may have several software routines operating in parallel, one of which is a safety or bypass routine if a sensor fails. The first routine to determine an alarm condition generates an alarm indicating output. These routines are fixed and operate without change. They do not adjust themselves to compensate for the loss of a sensor. More specifically, these routines do not make automatic adjustments to maintain sensitivity when a sensor fails but rather have failure mode sensitivities less sensitive than the normal mode sensitivities. A trouble indication is given by these detectors whenever a sensor fails so the less sensitive operating mode during trouble is tolerated. However, in many cases, this trouble mode may not be serviced in a timely manner and the fire protection is not optimum during the time frame between failure and servicing.

There are also prior art detectors that have more than one sensor and provide different audible sounds as a local warning. For example, some devices combine a smoke detector and a CO detector and give separate sounds locally at the device indicative of the type of detector responding. However, these devices do not transmit that information into a system and use this information for controlling other processes or functions such as ventilation, lighting, heating, security, etc.

It would be desirable if the advantages of multi-sensor processing could be provided with minimal sensitivity losses due to sensor failure. Preferably, substantially constant sensitivity could be provided even where a sensor fails. It would be most desirable if such functionality could be provided without significantly increasing detector complexity or cost.

SUMMARY OF THE INVENTION

An ambient condition detector includes two or more sensors. Each sensor is coupled to a control circuit. The control circuit could, in one embodiment, be implement, at least in part, using integrated circuits including a programmed processor.

In one aspect of the invention, the sensors could respond to indicia of fire such as smoke, heat or gas, such as carbon monoxide. The control circuit processes the sensors' outputs to evaluate if a fire condition exists. Depending on the type of sensors used, other conditions can be sensed and evaluated. The selected sensors in combination with the processing result in a detector that has a characteristic sensitivity.

In yet another aspect of the invention, the characteristic sensitivity can be substantially maintained even if one of the sensors ceases functioning properly. In this embodiment, in response to a sensor failure the control circuitry processes the outputs from the remaining sensors so as to continue to maintain the same sensitivity.

Numerous other advantages and features of the present invention will become readily apparent from the following detailed description of the invention and the embodiments thereof, from the claims and from the accompanying drawings.

BRIEF DESCRIPTION OF THE FIGURES

FIG. 3 is a flow diagram of several different processing routines executable by the detector of FIG. 2;

FIG. 4 illustrates a flow diagram of alternate processing that takes into account a failure of a sensor;

FIG. 5 illustrates processing routines executable by the detector of FIG. 1; and FIG. 6 illustrates alternate processing routines executable by the detector of FIG. 1.

DETAILED DESCRIPTION

Figure 1:
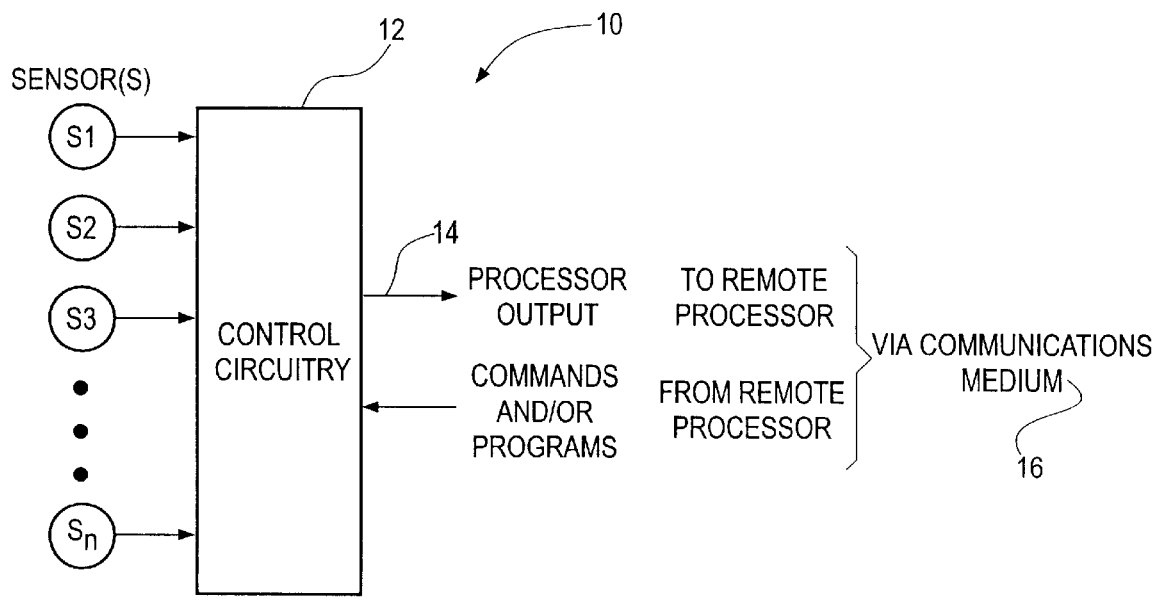
FIG. 1 illustrates a block diagram of a multiple sensor detector in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates an ambient condition detector 10 that incorporates multiple sensors S1, S2, S3, through SN. Outputs from one or more of these sensors can be processed by control circuitry 12 to produce one or more processed outputs indicative of the one or more ambient conditions to be detected. These outputs 14 can be transmitted to a remote processor via a communications medium 16. Medium 16 can be hardwired or wireless.

Figure 2:
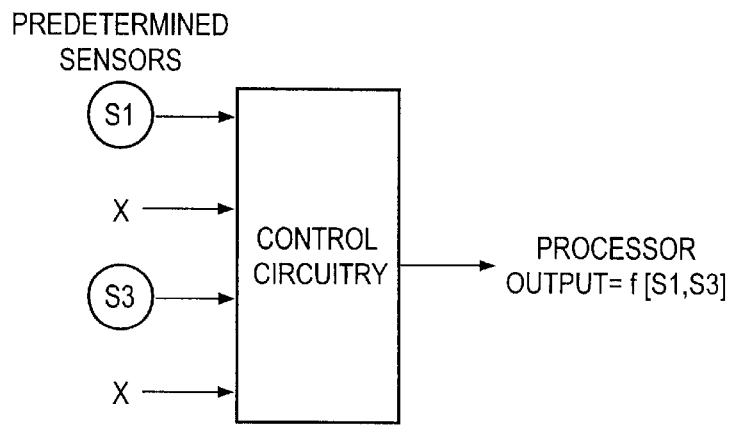
FIG. 2 illustrates the detector of FIG. 1 configured with selected sensors.

The control circuitry may incorporate a plurality of processing routines and may be constructed with discrete circuitry, custom integrated circuits, processors, or the like. As illustrated in FIG. 2, one or more of the sensors S1, S2 ... Sn can be selected depending on each different ambient condition desired to be detected. When different sensors are selected, then such as S1, S3, respective processing routines are also selected and executed.

Sensor selection can be implemented locally at the detector 10 at installation or when convenient. Selection can be by hardwired circuitry at the detector 10 or via software preloaded into the control circuitry 12. Alternately, commands and/or selection programs can be downloaded from a remote processor via the medium 16.

The sensors can include without limitation smoke, particle, gas, temperature, light, sound, security, or other sensors of an ambient condition. They can be combined in a multi-sensor detector, such as detector 10 to detect the desired ambient condition(s).

Examples of types of gas sensors includes optical, NDIR, photo-acoustic NDIR, polymers, or other like sensors that give a signal when selected gases are present in the environment. Gas sensors can include CO, CO2, H2, and H2O [humidity] sensors as well as sensors of other gases indicative of an environmental condition to be detected.

Optical sensors can respond to any light frequency including infrared and ultraviolet. They can be used to sense passive infrared, day/night or flames.

Smoke sensors can be implemented as scattering, obscuration or ionization type sensors. Particle sensors can include particle counters which may or may not measure the size of particles in the environment.

Temperature sensors can include thermistors or junction temperature sensing devices. Audio sensors can include microphones, crystals, or other devices sensitive to sound waves or vibration sources. Security sensors can include passive infrared or other types of motion or occupancy sensors.

An example of a multi-sensor detector 10 includes a combination of 1) smoke, 2) CO2, and 3) temperature sensors. Another example includes a combination of 1) smoke, 2) CO, and 3) temperature sensors or alternatively 1) CO and 2) temperature sensors.

FIG. 3 illustrates three different processing routines which are available at detector 10 for selection in detecting an ambient condition when sensors S1 and S3 are selected. Processing routine (1) of FIG, 3 is used if both sensors S1 and S3 are operational. The routine of FIG. 3 illustrates summing of smoothed sensor values.

Other processing routines can be used for any or all of the sensors without departing from the scope of this invention. The processing routines can use neural network routines, algorithms, fuzzy logic, weighed summing of sensors and the like without limitation.

If sensor S3 becomes non-operational by failing or by a command directing it to not contribute to the processed output 14, then the processing routine (2) of FIG. 3 is selected and executed. Routine (2) could be implemented using rate of change processing in addition to the smoothing, change in weighing values, and the like to compensate for the fact that sensor S3 is no longer contributing to the output processed value 14.

If sensor S1 becomes non-operational by failing or by a command directing it to not contribute to the processed output value 14, then the processing routine (3) of FIG. 3 is selected. Likewise, other routines can be selected other than those illustrated in FIG. 3.

In addition to selecting different routines, the operating routines can be altered during the failure of a sensor by automatically changing coefficients or weighing values. Alternately, gain or thresholds can be adjusted to facilitate using the responses of the remaining sensors to maintain sensitivity to the desired ambient condition(s).

Alteration of the processing routines may include assigning an operating sensor value to that of a non-operating sensor value. For example, if a detector contains three sensors [S1, S2, S3] and S2 becomes non-operational, and S3 is preferred over S1 in sensing the environmental condition, then the values of S3 could be assigned to S2 since S2 is non-operational. Outside of this alteration, the processing method could be otherwise unchanged. The detector will now determine the environmental condition only using sensors S1 and S3 but maintain a sensitivity that is close to its normal sensitivity. This process could be automatic and predetermined or executed after a command is received via the medium 16 directing the detector to make this substitution in sensor values.

FIG. 4 illustrates an example of a detector changing an alarm threshold when a sensor fails. The purpose is to adjust the sensitivity back toward the normal operating sensitivity.

In FIG. 4 the alarm threshold is reduced by 50% since the sensors were simply summed together with equal contribution in this example. If more complex or less complex processing were used, the alteration in the alarm threshold due to sensor failure could be more complex to maintain the desired sensitivity to the environmental condition.

The processing routines may be different if the selected sensors were S1 and S2 or if the selected sensors were S2 and SN. This functionality enables the detector to reconfigure itself by command for several different ambient conditions to be detected using an associated set of routines. In one example, the detector may be configured to detect a fire in a hallway. In another case, the detector may be configured to detect a fire in a bedroom. Also, the detector can be configured to detect a concentration of CO and/or CO2 in the desired area using different routines.

FIG. 5 illustrates an example where the detector contains four sensors. S1 and S2 and S3 are used to detect fire as the ambient condition. S1 and S3 are used to detect hazardous gas as the ambient condition. The respective detector can be commanded to switch or can automatically switch between programs to detect either ambient condition or both ambient conditions relatively simultaneously.

To detect both ambient conditions, the two different processing routines are included in the detector. One processing routine uses signals from sensors S1 and S2 and S3. The second processing routine uses signals from sensors S1 and S3. It is possible that the same sensors could be included in both the first processing and the second processing and the different environmental conditions determined by differences in the first and second processing methods. It is also possible that the output from a single sensor could be used as an input to two processing methods. These could output two different signals indicative of two associated environmental conditions.

FIG. 6 illustrates an example of processing where a multi-sensor detector incorporates three selected sensors and detects two environmental conditions. Outputs from the three sensors are combined to determine the presence of a fire condition using Smoke, CO2 (air quality), and T (temperature). Sensor S2 is used to detect an air quality environmental condition based on the degree of sensed CO2.

The different environmental conditions use different processing routines. If a sensor S1 or S2 or S3 fails, then the processing routines are altered or changed to different processing routines for the detection of the environmental conditions.

Various sensors can be incorporated into a single detector and used to detect different environmental conditions and to output signals used to control various functions associated with these various environmental conditions. In some cases, the sensors are located within the same detector but some of the processing is accomplished at another device or control unit(s) external from the detector. The environmental information is communicated to other devices or control unit(s) over the communication medium 16. This communication medium could be hardwired, wireless such as RF, light paths, or other mediums. The environmental information is used to control functions associated with the environmental conditions such as ventilation control, door lock control, heating control, lighting control, access control, or other controls designed into a system.

These multi-sensor detectors can incorporate compensation circuitry to adjust parameters internal to the processing to compensate for changes in the sensor's sensitivity or drift of signal values over time. The processing routines can use rates of change in sensor values, absolute sensor values, change in sensor values from longer term averages of sensor values, differentiation or integration of sensor values, algorithms, neural networks, fuzzy logic and many other processing methods to determine the environmental condition.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A multi-sensor detector comprising:
   at least first and second sensors;
   control circuitry coupled to the sensors wherein when both sensors are operational, outputs from both sensors are processed by the circuitry to evaluate the presence of a selected condition, and, when only one sensor is operational, an output from the one sensor is processed to evaluate the presence of the selected condition wherein a first sensitivity is exhibited when both sensors are operational, wherein a second sensitivity is exhibited when only one sensor is operational and as a result of processing by the circuitry, the first and second sensitivities are substantially the same.

2. A detector as in claim 1 wherein the control circuitry includes a programmed processor and prestored executable instructions wherein some of the instructions implement dual sensor signal processing and others implement single sensor signal processing.

3. A detector as in claim 2 wherein dual sensor processing instructions contribute to a first, dual sensor sensitivity and single sensor processing instructions contribute to a second, single sensor sensitivity and wherein the sensitivities are substantially identical.

4. A detector as in claim 2 wherein the sensors are different.

5. A detector as in claim 4 wherein the sensors are responsive to different types of ambient conditions.

6. A detector as in claim 4 wherein the sensors are responsive to the same type of ambient condition.

7. A detector as in claim 2 wherein the sensors are selected from a class which includes a smoke detector, a heat detector and a gas detector.

8. A detector as in claim 2 wherein the processor includes instructions for generation of a signal indicative of a change in the number of operational sensors.

9. A detector as in claim 8 wherein the instructions generate a signal indicative of a reduction in the number of operational sensors.

10. A detector as in claim 2 which includes an interface, coupled to the control circuitry, for communication with an external medium.

11. A detector as in claim 2 wherein the sensors are selected from a class which includes smoke sensors, thermal sensors, gas sensors and flame sensors.

12. A multi-sensor detector comprising:
    a housing;
    at least first and second sensors carried by the housing; and
    control circuitry responsive to outputs from the sensors wherein when predetermined sensors are operational, outputs from the predetermined sensors are processed by the circuitry using a first process with a first sensitivity to evaluate the presence of a selected condition, and, when at least one sensor of the predetermined sensors is not operational and would result in a change in the first sensitivity, one or more outputs from the remaining predetermined sensors are processed by the circuitry using a second process to evaluate the presence of a selected condition wherein the second process results in a sensitivity to the ambient condition approaching that of the first sensitivity to the ambient condition.

13. A detector as in claim 12 wherein at least part of the control circuitry is not contained within the housing and is remote from the sensors.

14. A detector as in claim 12 wherein the control circuitry is contained within the same housing as the sensors.

15. A detector as in claim 13 wherein representations of the outputs are transmitted between the sensors and at least part of the control circuitry by at least one of a wired, or wireless medium.

16. A detector as in claim 15 wherein the representations are transmitted in a binary form.

17. A detector as in claim 12 wherein the sensors are selected from a class which includes a smoke sensor, a heat sensor, a gas sensor, a flame sensor and an optical sensor.

18. A detector as in claim 12 wherein the control circuitry responds to commands received to select which sensors are to be operational and which sensors are not to be operational.

19. A detector as in claim 18 wherein the selected condition to be detected is altered by commands received by the control circuitry.

20. A detector as in claim 19 wherein processing of sensor outputs is changed when the selected condition to be detected is altered.

21. A detector as in claim 12 wherein the control circuitry includes a programmed processor.

22. A detector as in claim 12 wherein the control circuitry generates a signal indicative of a change in the number of operational sensors.

23. A detector as in claim 22 wherein the control circuitry generates signals indicative of which sensors are operational.

24. A detector as in claim 22 wherein the control circuitry generates signals indicative of which sensors are non-operational.

25. A detector as in claim 12 wherein the second process includes a change in the alarm threshold.

26. A detector as in claim 12 wherein the second process incorporates a change in the contributions of the outputs of selected sensors.

27. A detector as in claim 12 wherein a failed or non-operational sensor is assigned a predetermined value as an output for use in the processing to determine the existence of an environmental condition.

28. A detector as in claim 12 wherein the second processing is substantially different than the first processing.

29. A detector as in claim 12 wherein a failed or non-operational sensor is assigned the output values of another sensor for use in processing to determine the existence of an environmental condition.

30. A multi-function unit comprising:
a plurality of sensors;
control circuitry coupled to the sensors wherein the control circuitry includes circuitry for identifying active sensors wherein when all active sensors are operational, outputs from the active sensors are processed by the circuitry using a first process with a first sensitivity to evaluate the presence of a selected condition, and, when at least one of the active sensors malfunctions and would result in a change in the first sensitivity, one or more outputs from the remaining active sensors are processed by the circuitry using a second process to evaluate the presence of a selected condition wherein the second process results in a sensitivity to the ambient condition approaching that of the first sensitivity to the ambient condition.

31. A unit as in claim 30 wherein the control circuitry processes outputs of selected sensors to evaluate the presence of the selected condition and includes circuitry to process the output of at least one sensor to evaluate the presence of a second selected condition.

32. A unit as in claim 31 wherein the at least one sensor is one of the selected sensors.

33. A unit as in claim 32 wherein the sensors are selected from a class which includes fire sensors, gas sensors, temperature sensors, humidity sensors, light sensors, audio sensors, motion sensors and position sensors.

34. A unit as in claim 31 wherein the control circuitry processes outputs from a subset of the selected sensors to evaluate the presence of the second condition.

35. A unit as in clam 30 wherein the circuitry for identifying active sensors comprises at least one of identifying circuitry for receiving information from a local source and circuitry for receiving information from a remote source.

36. A unit as in claim 30 wherein the control circuitry includes a programmed processor.

37. A multi-sensor detector comprising:
at least first and second sensors for sensing different types of ambient conditions; and
control circuitry coupled to the sensors wherein when predetermined sensors are operational, outputs from these predetermined sensors are processed by the circuitry using a first process for detecting a first environmental condition and processed using at least a second process for detecting at least a second environmental condition different than the first environmental condition, wherein the detection of at least one of the first and second environmental conditions is based upon the outputs from multiple ones of the at least first and second sensors; and
including circuitry to provide information regarding each environmental condition which is communicable to at least another processor over a communication medium; and
the environmental condition information is used to control functions associated with the detected conditions.

38. A detector as in claim 37 wherein a CO2 sensor is combined with a smoke sensor and outputs therefrom are processed using a first process for determining a fire condition.

39. A detector as in claim 37 wherein one sensor is a smoke sensor and another sensor is a temperature sensor.

40. A detector as in claim 39 wherein outputs from the smoke sensor are combined with outputs from the temperature sensor and processed using a first process for determining a fire condition as the environmental condition.

41. A detector as in claim 39 wherein outputs from the temperature sensor are processed with a second process for determining a room comfort condition as the environmental condition.

42. A detector as in claim 41 wherein the room comfort information is used to control functions including ventilation, heating, or cooling system of at least a portion of a building.

43. A detector as in claim 37 wherein one sensor is a smoke sensor and another sensor is a security or occupancy sensor.

44. A detector as in claim 43 wherein outputs from the smoke sensor are combined with outputs from the security or occupancy sensor and processed using a first process for determining a fire condition.

45. A detector as in claim 43 wherein the security or occupancy sensor is processed with a second process for determining a security condition.

46. A detector as in claim 45 wherein the security information is used to control a security notification or alarm system of at least a portion of a building.

47. A detector as in claim 37 wherein the sensors are selected from a class including gas, smoke, fire, heat, light or sound sensors.

48. A detector as in claim 37 wherein at least one process for detecting an environmental condition takes place in the detector.

49. A detector as in claim 37 wherein at least one process for detecting an environmental condition takes place at a displaced processor.

50. A detector as in claim 49 wherein the detector transmits sensor information to the remote processor in digital form over a communication medium.

51. A detector as in claim 37 wherein the environmental information is a message composed of binary bits.

52. A detector as in claim 37 wherein the environmental information is a measure of the degree of ambient environmental condition.

53. A multi-sensor detector comprising:
at least first and second sensors for sensing different types of ambient conditions; and
control circuitry coupled to the sensors wherein when predetermined sensors are operational, outputs from these predetermined sensors are processed by the circuitry using a first process for detecting a first environmental condition and processed using at least a second process for detecting at least a second environmental condition different than the first environmental condition, wherein at least one of the at least first and second sensors is used in the detection of both the first environmental condition and the second environmental condition; and
including circuitry to provide information regarding each environmental condition which is communicable to at least another processor over a communication medium; and
the environmental condition information is used to control functions associated with the detected conditions.

54. A detector as in claim 53 wherein the CO2 sensor is combined with the smoke sensor and processing using a first process for determining a fire condition.

55. A detector as in claim 54 wherein the outputs from the CO2 sensor are processed with a second process for determining the air quality condition.

56. A detector as in claim 54 wherein the air quality information is used to control a ventilation function of at least a portion of a building.

57. A unit as in claim 30 wherein the control circuitry includes circuitry for transmitting to a remote receiver an indicium of a malfunctioning sensor.

* * * * *